US012573429B2

(12) United States Patent
Du et al.

(10) Patent No.: US 12,573,429 B2
(45) Date of Patent: Mar. 10, 2026

(54) VIDEO PROCESSING METHOD AND APPARATUS, ELECTRONIC DEVICE AND STORAGE MEDIUM

(71) Applicant: Beijing Zitiao Network Technology Co., Ltd., Beijing (CN)

(72) Inventors: Cong Du, Beijing (CN); Rufeng Xue, Beijing (CN); Zhitao Xu, Beijing (CN); Liutao Lan, Beijing (CN); Zhiliang Zheng, Beijing (CN); Shuai Zheng, Beijing (CN); Xiwang Jin, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 49 days.

(21) Appl. No.: 18/572,757

(22) PCT Filed: Jul. 15, 2022

(86) PCT No.: PCT/CN2022/105922
§ 371 (c)(1),
(2) Date: Dec. 20, 2023

(87) PCT Pub. No.: WO2023/011142
PCT Pub. Date: Feb. 9, 2023

(65) Prior Publication Data
US 2024/0290355 A1      Aug. 29, 2024

(30) Foreign Application Priority Data
Aug. 3, 2021      (CN) .......................... 202110888448.1

(51) Int. Cl.
*G11B 27/031* (2006.01)
*G10L 15/26* (2006.01)
(Continued)

(52) U.S. Cl.
CPC ............ *G11B 27/031* (2013.01); *G10L 15/26* (2013.01); *G10L 25/57* (2013.01); *G11B 27/34* (2013.01)

(58) Field of Classification Search
CPC ....... G11B 27/031; G11B 27/34; G10L 15/26; G10L 25/57
See application file for complete search history.

(56) References Cited

U.S. PATENT DOCUMENTS

| | | | |
|---|---|---|---|
| 2008/0008442 A1 | 1/2008 | Shibata et al. | |
| 2012/0323897 A1 | 12/2012 | Daher et al. | |
| 2022/0068258 A1* | 3/2022 | Jindal | ................... G06F 40/253 |

FOREIGN PATENT DOCUMENTS

| | | |
|---|---|---|
| CN | 101098433 A | 1/2008 |
| CN | 107566803 A | 1/2018 |

(Continued)

OTHER PUBLICATIONS

International Patent Application No. PCT/CN2022/105922; Int'l Search Report; dated Oct. 11, 2022; 3 pages.

(Continued)

*Primary Examiner* — Girumsew Wendmagegn
(74) *Attorney, Agent, or Firm* — BakerHostetler

(57) ABSTRACT

Disclosed herein are a video processing method and apparatus, an electronic device and a storage medium. The video processing method comprises: receiving a detection operation for a video; in response to the detection operation, detecting invalid audio clips in the video, and displaying invalid audio clip information; receiving a deletion operation for a video clip corresponding to target invalid audio clip information; and in response to the deletion operation, deleting the video clip corresponding to the target invalid audio clip information in the video.

17 Claims, 6 Drawing Sheets

(51) Int. Cl.
    *G10L 25/57*        (2013.01)
    *G11B 27/34*        (2006.01)

(56)                References Cited

FOREIGN PATENT DOCUMENTS

| CN | 107948718 A | 4/2018 |
|----|-------------|--------|
| CN | 109040773 A | 12/2018 |
| CN | 109708256 A | 5/2019 |
| CN | 109801648 A | 5/2019 |
| CN | 110111816 A | 8/2019 |
| CN | 110189751 A | 8/2019 |
| CN | 110392281 A | 10/2019 |
| CN | 110401878 A | 11/2019 |
| CN | 110992989 A | 4/2020 |
| CN | 111462741 A | 7/2020 |
| CN | 111885313 A | 11/2020 |
| CN | 112185424 A | 1/2021 |
| CN | 112231498 A | 1/2021 |
| CN | 112235632 A | 1/2021 |
| CN | 112562684 A | 3/2021 |
| CN | 112929744 A | 6/2021 |
| CN | 113052085 A | 6/2021 |
| CN | 113613068 A | 11/2021 |

OTHER PUBLICATIONS

Written Opinion for International Application No. PCT/CN2022/105922, mailed Oct. 11, 2022, 9 Pages.

* cited by examiner

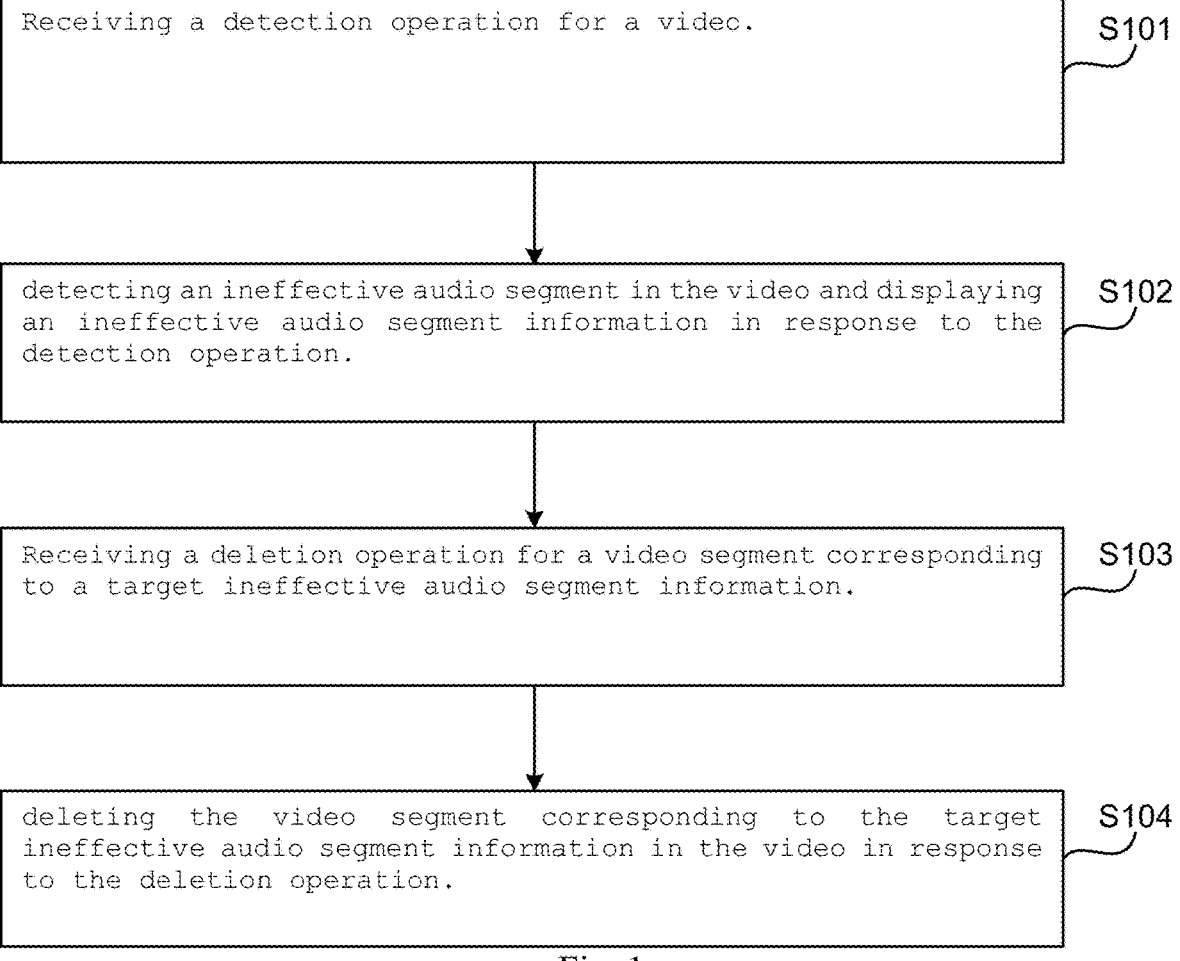

Receiving a detection operation for a video.                                S101 detecting an ineffective audio segment in the video and displaying     S102
an ineffective audio segment information in response to the
detection operation.

Receiving a deletion operation for a video segment corresponding       S103
to a target ineffective audio segment information.

deleting the video segment corresponding to the target                 S104
ineffective audio segment information in the video in response
to the deletion operation.

Fig. 1

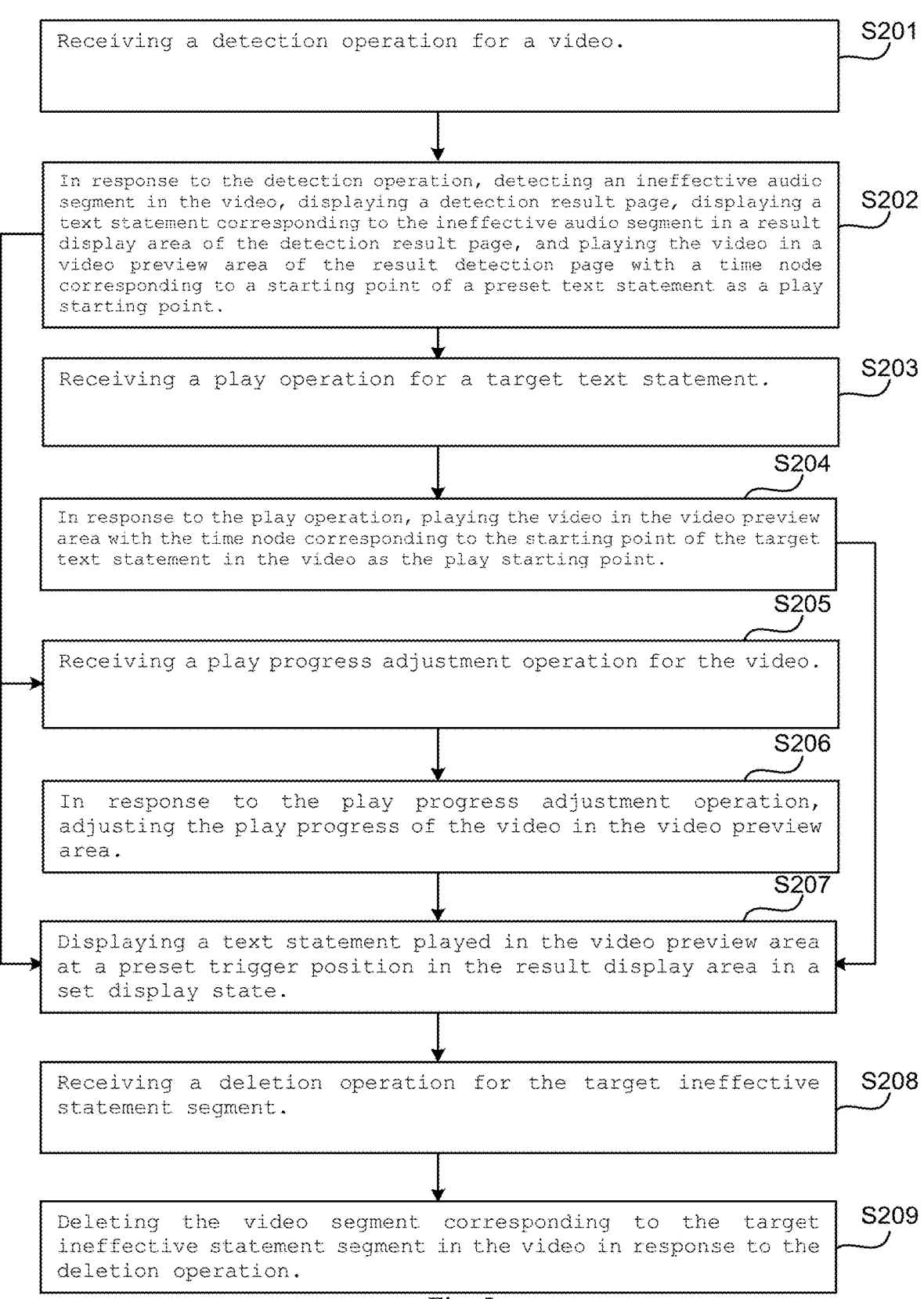

Receiving a detection operation for a video.

S201

In response to the detection operation, detecting an ineffective audio segment in the video, displaying a detection result page, displaying a text statement corresponding to the ineffective audio segment in a result display area of the detection result page, and playing the video in a video preview area of the result detection page with a time node corresponding to a starting point of a preset text statement as a play starting point.

S202

Receiving a play operation for a target text statement.

S203

In response to the play operation, playing the video in the video preview area with the time node corresponding to the starting point of the target text statement in the video as the play starting point.

S204

Receiving a play progress adjustment operation for the video.

S205

In response to the play progress adjustment operation, adjusting the play progress of the video in the video preview area.

S206

Displaying a text statement played in the video preview area at a preset trigger position in the result display area in a set display state.

S207

Receiving a deletion operation for the target ineffective statement segment.

S208

Deleting the video segment corresponding to the target ineffective statement segment in the video in response to the deletion operation.

VIDEO PROCESSING METHOD AND APPARATUS, ELECTRONIC DEVICE AND STORAGE MEDIUM

The present application is the U.S. National Stage Application of International Patent Application No. PCT/CN2022/105922, filed on Jul. 15, 2022, which claims priority to Chinese Patent Application No. 202110888448.1 filed on Aug. 3, 2021, which are incorporated by reference in the present application in their entireties.

TECHNICAL FIELD

The present disclosure relates to the field of video processing technology, for example to a video processing method and apparatus, an electronic device and a storage medium.

BACKGROUND

During the process of capturing a video, the user might get stuck in speech due to nervousness, inexperience or personal speech habits, or fill in the gaps between speeches with ineffective words (for example, er, uh, well).

In the related art, when stuck speeches or ineffective words occur during the process of capturing a video, the user needs to try out the captured video repeatedly to determine the positions of stuck speeches and ineffective words, and cuts stuck speeches and ineffective words in the video based on the positions.

However, this video processing method is cumbersome to operate, which is not conducive for the user to capture and post a video rapidly.

SUMMARY

The present disclosure provides a video processing method and apparatus, an electronic device and a storage medium, so as to rapidly detect and cut video segments corresponding to stuck speeches and/or useless words in the video.

The present disclosure provides a video processing method, comprising:

receiving a detection operation for a video;

detecting an ineffective audio segment in the video and displaying the ineffective audio segment information in response to the detection operation;

receiving a deletion operation for a video segment corresponding to the target ineffective audio segment information; and deleting the video segment corresponding to the target ineffective audio segment information in the video in response to the deletion operation.

The present disclosure also provides a video processing apparatus, comprising:

a detection operation receiving module configured to receive a detection operation for a video; an information display module configured to detect an ineffective audio segment in the video and display the ineffective audio segment information in response to the detection operation; a deletion operation receiving module configured to receive a deletion operation for a video segment corresponding to the target ineffective audio segment information; and a deleting module configured to delete the video segment corresponding to the target ineffective audio segment information in the video in response to the deletion operation.

The present disclosure further provides an electronic device, comprising:

at least one processor;

a memory provided to store at least one program;

the at least one program, when executed by the at least one processor, causing the at least one processor implements the video processing method described above.

The present disclosure also provides a computer-readable storage medium having a computer program stored thereon that, when executed by a processor, implements the video processing method described above.

BRIEF DESCRIPTION OF THE ACCOMPANYING DRAWINGS

FIG. 1 is a flowchart of a video processing method provided by an embodiment of the present disclosure;

FIG. 5 is a flowchart of another video processing method provided by an embodiment of the present disclosure;

DETAILED DESCRIPTION

Figure 2:
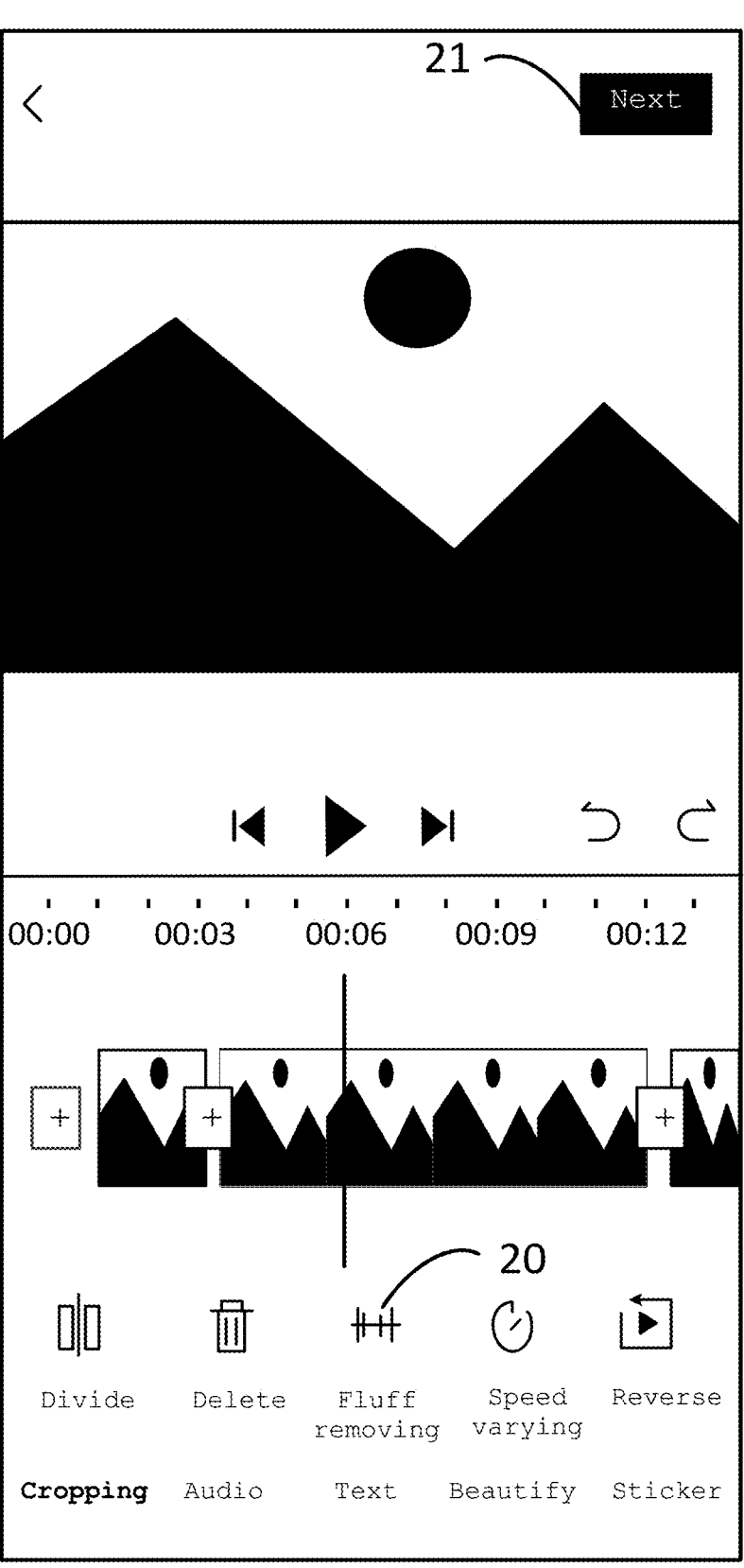
FIG. 2 is a schematic view of a video editing page provided by an embodiment of the present disclosure.

The embodiments of the present disclosure will be described below with reference to the accompanying drawings. Although some embodiments of the present disclosure are shown in the accompanying drawings, the present disclosure may be implemented in a plurality of forms, and these embodiments are provided for understanding the present disclosure. The accompanying drawings and embodiments of the present disclosure are for exemplary purposes only.

A plurality of steps recited in the method embodiments of the present disclosure may be performed according to different sequences, and/or performed in parallel. In addition, the method embodiments may comprise additional steps and/or omit to perform the illustrated steps. The scope of the present disclosure is not limited in this respect.

As used herein, the term "comprising" and its variants are open-ended inclusion, that is, "comprising but not limited to". The term "based on" means "at least partially based on". The term "one embodiment" means "at least one embodiment"; the term "another embodiment" means "at least one additional embodiment"; and the term "some embodiments" means "at least some embodiments". The related definitions of other terms will be given in the following description.

The concepts such as "first" and "second" mentioned in the present disclosure are only used to distinguish different devices, modules or units, but not to limit the order or interdependence of functions performed by these devices, modules or units.

The modifications of "one" and "a plurality of" mentioned in the present disclosure are illustrative rather than restrictive, and those skilled in the art should understand that they should be understood as "one or more" unless specified otherwise in the context.

The names of messages or information exchanged between multiple devices in the embodiments of the present disclosure are only used for illustrative purposes, but not for limiting the scope of these messages or information.

FIG. 1 is a flowchart of a video processing method provided by an embodiment of the present disclosure. The method may be performed by a video processing apparatus, wherein the apparatus may be realized by software and/or hardware, and may be configured in an electronic device, for example, the apparatus may be configured in a mobile phone or a tablet computer. The video processing method provided by the embodiment of the present disclosure is adapted to detect and delete scenes of ineffective statement segments and/or speech pause segments in the video. As shown in FIG. 1, the video processing method provided by this embodiment may comprise:

In S101, a detection operation for a video is received.

This video may be understood as the video that is being currently edited, for example, the video presented in the video editing page. The detection operation may be a trigger operation to detect ineffective words and/or speech pauses contained in a video, for example, an operation to trigger a detection control in the video editing page.

As an example, the electronic device displays the video editing page. When intended to view ineffective words and/or speech pauses contained in the target video segment, the user may trigger the detection control displayed in the video editing page. Correspondingly, when it is detected that the user triggers the detection control in the video editing page, the electronic device can determine that the detection operation for a video is received.

In this embodiment, the video may comprise one or more video segments, and the detection range of the video and the type of the detected ineffective audio segments may be set by the developer and/or the user, for example, when the user does not perform setting, all video segments contained in the video may be detected by default, and ineffective words and speech pauses contained in all video segments may be detected by default; when the user performs setting, only the video segments set by the user may be detected, and/or the types of the ineffective audio segments set by the user (for example, ineffective words and/or speech pauses) may be detected based on the user's settings. For example, before receiving the detection operation for a video, there further comprises: receiving a trigger operation acting on a video segment cropping control corresponding to the video, wherein the video comprises at least one video segment; and displaying a setting window for a user to set a video segment to be detected and/or a type of an ineffective audio segment to be detected and perform the detection operation in response to that trigger operation.

The video segment to be detected may be the video segment for the detection operation, that is, the video segment for which the user is intended to detect ineffective words and/or speech pauses contained in the video, for example, the target video segment, which may comprise one or more video segments. The video segment cropping control may be triggered by the user to set a target video segment and a type of an ineffective audio segment, so as to enter the detection and cropping process of ineffective words and/or speech pauses for the target video segment.

Figure 3:
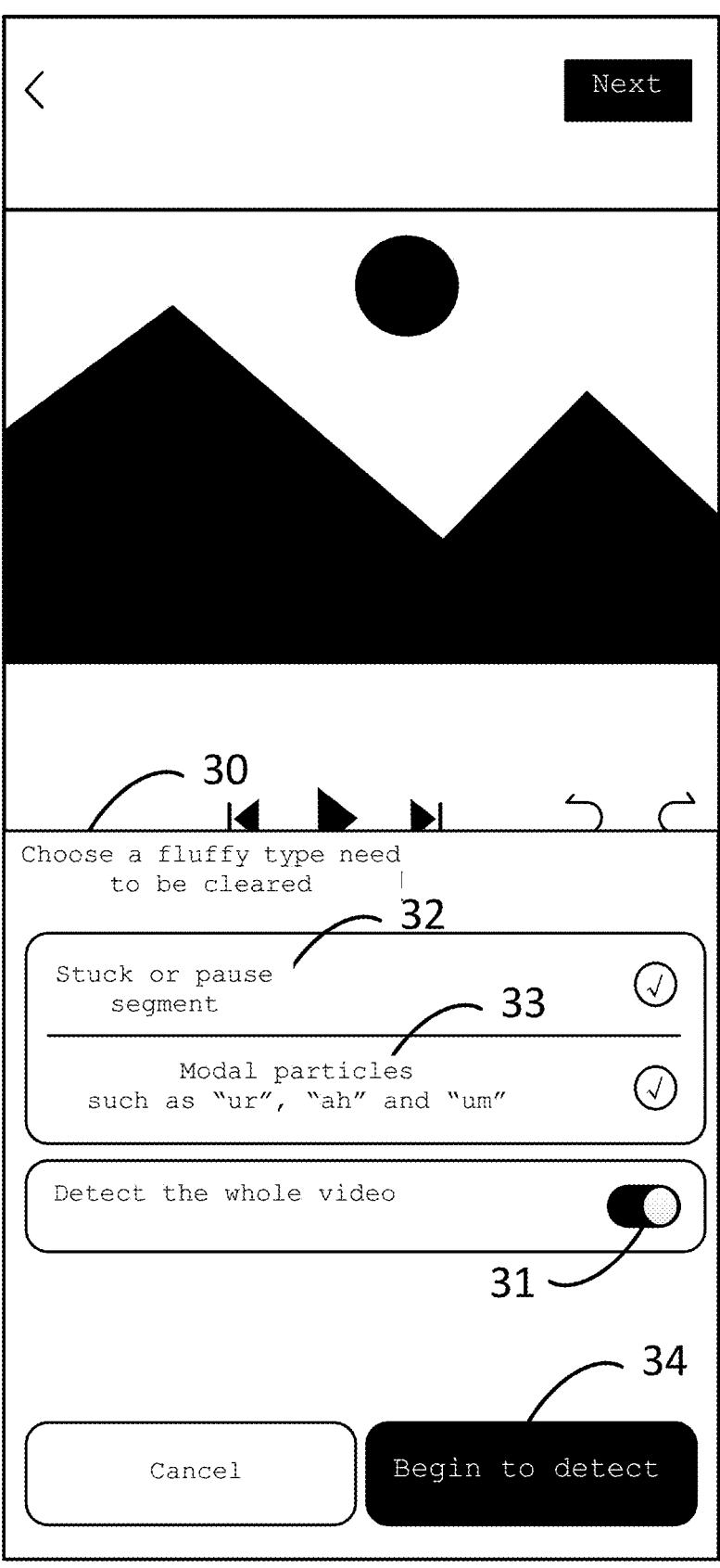
FIG. 3 is a schematic view of a setup window provided by an embodiment of the present disclosure.

As shown in FIG. 2, the electronic device may display a video segment cropping control 20 in the video editing page. When intended to set the target video segment and the detection content and crop the target video segment, the video segment cropping control 20 may be triggered. When the electronic device detects that the user triggers the video segment cropping control 20 in the video editing page, it can display the setting window 30, as shown in FIG. 3. Therefore, the user may set the target video segment and the detection content in the setting window 30, for example, detecting all video segments in the video or the video segments that are being currently edited in the video editing page (for example, video segments that are being currently played) by adjusting the entire video detection control 31 to an open state or a closed state, and/or detecting the speech pause segment 32 and/or the modal particle segment 33 by adjusting the same to a selected state, and the detection control 34 in the setting window 30 may be triggered after setting is completed. Correspondingly, when it is detected that the user triggers the detection control 34 in the setting window 30, the electronic device determines that the detection operation is received, and determine the on-off state of the entire video detection control 31 in the setting window 30, and when the entire video detection control 31 is in the on state, all video segments in the video are regarded as target video segments, and when the entire video detection control 31 is in the off state, the video segments that are being currently edited are regarded as target video segments; and the types in the selected state (for example, the speech pause segment 32 and/or the modal particle segment 33) are regarded as the types of ineffective statement segments required to be detected. Therefore, when the detection operation is received, the target video segment in the video may be detected, and ineffective audio segment information of ineffective audio segments in the target video segment may be displayed; when the deletion operation for the target ineffective audio segment information in the displayed ineffective audio segment information is received, the sub-video segment corresponding to the target ineffective audio segment information in the target video segment may be deleted, that is, the ineffective audio segments corresponding to the target ineffective audio segment information and the video content corresponding to the ineffective audio segments may be deleted.

In this embodiment, it is possible to change or not change the amount of video segments contained in the video when the sub-video segment corresponding to the target ineffective audio segment information is deleted, that is, after a sub-video segment in the video is deleted, the video segment in which the sub-video segment is located may be re-synthesized or not synthesized into a video segment, and this embodiment is not limited thereto. Considering the user's waiting time, for example, the video segment in which the sub-video segment is located may not be synthesized directly after deleting the sub-video segment corresponding to the target ineffective audio segment information, that is, after the sub-video segment corresponding to the target ineffective audio segment information in a video segment is deleted, the video segment may be presented in the form of a plurality of sub-video segments, and video synthesis may be performed when the user posts the video, so as to avoid the case where the user needs to wait for a long time when there is a large amount of the sub-video segments corresponding to the target ineffective audio segment information to be deleted, thereby improving the user's experience.

In S102, in response to the detection operation, the ineffective audio segment in the video is detected and the ineffective audio segment information is displayed.

The ineffective audio segment may be an ineffective audio segment in the video, which may comprise an ineffective statement segment and/or an ineffective speech pause segment and the like, and description will be made below with the ineffective audio segment comprising an ineffective statement segment and a speech pause segment as an example. The ineffective statement segment may be understood as the statement segment corresponding to the ineffective word in the statement, which may comprise modal particles such as "ur", "ah", "um" and "well". The ineffective speech pause segment may be a segment in which speech in the video has an ineffective pause for a long time, for example, an ineffective pause segment in which speech is not detected and the duration exceeds a preset duration (for example, 3 s or 5 s). The ineffective audio segment information may be understood as the audio segment information of the ineffective audio segment, for example, the recognition information of the ineffective audio segment, the location information of the ineffective audio segment in the video, the ineffective statement segment corresponding to the ineffective audio segment (that is, the text corresponding to the ineffective audio segment), the statement in which the ineffective audio segment is located, and/or the effective audio segment information in the statement.

When the electronic device receives the detection operation for the target video segment, it can detect the ineffective audio segment of the target video segment, obtain the ineffective audio segment contained in the target video segment, and display the ineffective audio segment information of the detected ineffective audio segment in response to the detection operation.

In this embodiment, the detection method of the ineffective audio segment may be flexibly provided, for example, the ineffective audio segment may be determined based on speech recognition and semantic analysis, and the ineffective audio segment may also be referred to as a fluffy segment, where fluff may be "silent segments" or "ineffective words (um, well . . . )" of useless scenes and stuck speeches, for example. For example, based on speech recognition, it is possible to determine that the text segment corresponding to the audio is "What took you so . . . so long? I feel worried already", and based on semantic analysis, it is possible to determine that the first "so" in this text segment is an effective statement segment, while the second "so" is an ineffective statement segment; for the pause segment in the audio data of the video, if it is determined that the pause segment is located between two statements based on semantic analysis, the pause segment can be determined as an effective statement segment; if it is determined that the pause segment is located inside a statement based on semantic analysis, the pause segment can be determined as an ineffective statement segment.

As an example, when performing the ineffective audio segment detection, the audio data of the video may be directly input into the detection model obtained by training in advance, so that speech recognition and semantic recognition are performed on the audio data of the video using the detection model to obtain the ineffective audio segment contained in the video; alternatively, speech recognition may be first performed on the audio data of the video to obtain the text data corresponding to the audio data, and semantic recognition may be then performed on the text data to obtain the ineffective statement segment and determine the ineffective audio data corresponding to the ineffective statement segment.

In one embodiment, the ineffective audio segment information comprises an ineffective statement segment corresponding to the ineffective audio segment, and the displaying the ineffective audio segment information comprises: displaying a text statement corresponding to the ineffective audio segment, wherein the text statement is obtained by performing speech recognition on the audio statement in which the ineffective audio segment is located, and the text statement comprises an effective statement segment and the ineffective statement segment, and the ineffective statement segment is displayed differently from the effective statement segment.

The ineffective statement segment may be understood as a text corresponding to the ineffective audio segment, for example, a text segment obtained by Speech to Text (STT) recognition of the ineffective audio segment. The text statement may be a statement containing an ineffective statement segment, that is, a statement in the form of a text corresponding to the audio statement in which the detected ineffective audio segment is located, which may be obtained by performing speech recognition on the audio statement. When the audio statement in which the ineffective audio segment is located only contains the ineffective audio segment, the text statement corresponding to the ineffective audio segment may only contain the ineffective statement segment; when the audio statement in which the ineffective audio segment is located contains not only the ineffective audio segment but also the effective audio segment, the text statement corresponding to the ineffective audio segment may contain the ineffective statement segment and the effective statement segment.

Figure 4:
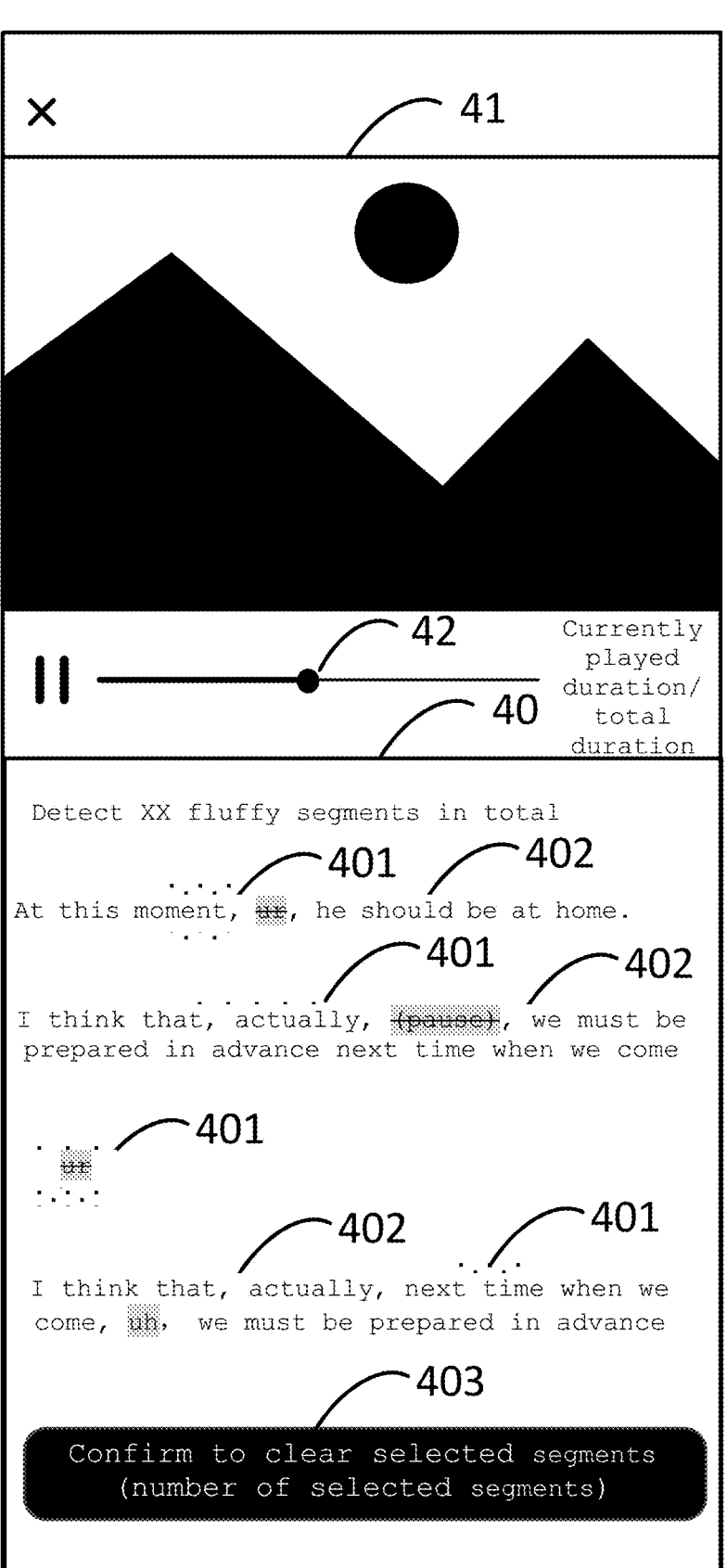
FIG. 4 is a schematic view of a detection result page provided by an embodiment of the present disclosure.

As an example, when an electronic device receives the detection operation for a video, it can detect the video to obtain an ineffective audio segment contained in the video and an ineffective statement segment 401 corresponding to the ineffective audio segment, and display each detected ineffective statement segment 401, for example, display a text statement 402 in which each ineffective statement segment 401 is located, and display in each text statement 402 the ineffective statement segment 401 contained in the text statement 402 in a different display mode from the effective statement segment in the text statement 402 (that is, the statement segment other than the ineffective statement segment 401), in response to the detection operation, as shown in FIG. 4 (with the text statement 402 in the target video segment displayed in the result display area 40 of the detection result page as an example in the drawing). Wherein, the text statement 402 may be displayed in the video editing page or the detection result page, that is, the electronic device may directly display the text statement 402 corresponding to the detected ineffective audio segment in the video editing page; alternatively, the current page may be shifted from the video editing page to the detection result page, and the text statement 402 corresponding to the detected ineffective audio segment may be displayed in the detection result page.

In the above-described embodiments, the displaying the text statement corresponding to the ineffective audio segment comprises: displaying a detection result page and displaying a text statement corresponding to the ineffective audio segment in a result display area of the detection result page, wherein the detection result page also comprises a video preview area for playing the video.

In the above-described embodiments, the text statement in the video may be displayed in the detection result page, and the video may be played at the same time, so that the user can view a video segment corresponding to each ineffective statement segment in the video whilst viewing an ineffective statement segment, thereby determining whether it is necessary to cut the video segment corresponding to the ineffective statement segment.

When the detection operation is received, the electronic device detects the ineffective audio segment in the video, determines the text statement corresponding to the ineffective audio segment, shifts the currently displayed page from the video editing page to the detection result page, and displays each text statement in the result display area of the detection result page, and plays the video in the video preview area of the detection result page, for example, playing the video from an initial position of the video; according to a temporal sequence of a plurality of text statements in the video, starting from a time node corresponding to a starting point of the first text statement in the video, the video or video segments corresponding to a plurality of text statements are played; alternatively, the video segment corresponding to the text statement currently located at a preset trigger position is played on a loop, and so forth.

If the video does not contain an ineffective audio segment, that is, if an ineffective audio segment is not detected, a prompt message may be displayed directly in the video editing page without shifting to the detection result page so as to prompt the user that an ineffective audio segment is not detected.

In S103, the deletion operation for the video segment corresponding to the target ineffective audio segment information is received.

The target ineffective audio segment information may be the information of the ineffective audio segment for which the user is intended to delete the video segment corresponding to the same from the video, and it may be one or more of the ineffective audio segment information, for example, the target audio segment information may be the ineffective audio segment information in the selected state. The video segment corresponding to the target ineffective audio segment information may be the video segment corresponding to the target ineffective audio segment information in the video, that is, the video segment in which the ineffective audio segment corresponding to the target ineffective audio segment information is located, also that is, the ineffective video segment in the video (also referred to as a fluffy video segment), wherein the ineffective video segment comprises the ineffective audio segment and video frames corresponding to the ineffective audio segment, where the starting point of the ineffective video segment may be the time node corresponding to the starting point of the ineffective audio segment in the video, and the ending point of the ineffective video segment may be the time node corresponding to the ending point of the ineffective audio segment in the video. The deletion operation may be a trigger operation to delete the video segment corresponding to the ineffective audio segment information selected by the user, for example, an operation to trigger the displayed deletion control.

When the user is intended to delete the video segment corresponding to the target ineffective audio segment information, the deletion control may be triggered. Correspondingly, when it is detected that the user triggers the deletion control, the electronic device determines that the deletion operation for the video segment corresponding to the target ineffective audio segment information is received.

In one embodiment, the target ineffective audio segment information is the ineffective audio segment information in a selected state, and the method further comprises: receiving a state adjustment operation for any ineffective audio segment information; adjusting, in response to the state adjustment operation, the display state of the ineffective audio segment information on which the state adjustment operation acts to shift the ineffective audio segment information on which the state adjustment operation acts from the selected state to the unselected state, or shift the ineffective audio segment information on which the state adjustment operation acts from the unselected state to the selected state.

The state adjustment operation may be an operation to adjust the state of an ineffective audio segment information, for example, an operation to trigger an ineffective audio segment information.

In the above-described embodiments, when the user triggers an ineffective statement segment displayed in the result display area, the state of the ineffective statement segment is shifted, for example, when the ineffective statement segment is in the selected state, the ineffective statement segment is adjusted from the selected state to the unselected state; when the ineffective statement segment is in the unselected state, the ineffective statement segment is adjusted from the unselected state to the selected state, so as to facilitate the user to adjust the ineffective audio segment information corresponding to the video segment that is intended to be deleted.

Taking the ineffective audio segment information comprising the ineffective statement segment corresponding to the ineffective audio segment as an example, as shown in FIG. 4 (with the first three ineffective statement segments 401 in the selected state and the last ineffective statement segment 401 in the unselected state as an example in FIG. 4), the electronic device may display text statements 402, and display the ineffective statement segment 401 in each text statement 402 in the selected state by default. Therefore, the user may trigger the ineffective statement segment 401 displayed by the electronic device to instruct the electronic device to shift the ineffective statement segment 401 in the selected state to the unselected state or shift the ineffective statement segment 401 in the unselected state to the selected state, and may trigger the deletion control 403 displayed by the electronic device after the ineffective statement segment 401 is selected. Correspondingly, the electronic device may shift, when it is detected that the user triggers an ineffective statement segment 401 in the selected state, the ineffective statement segment 401 from the selected state to the unselected state (for example, shifting from displaying the deletion mark of the ineffective statement segment to ceasing displaying the deletion mark of the ineffective statement segment), shift, when it is detected that the user triggers an ineffective statement segment 401 in the unselected state, the ineffective statement segment 401 from the unselected state to the selected state (for example, shifting from ceasing displaying the deletion mark of the ineffective statement segment to displaying the deletion mark of the ineffective statement segment), and, when it is detected that the user triggers a deletion control 403, make the ineffective statement segment 401 in the selected state as the target ineffective audio segment information to be deleted this time, and confirm that the deletion operation for the target ineffective audio segment information is received.

In S104, in response to the deletion operation, the video segment corresponding to the target ineffective audio segment information in the video is deleted.

In this embodiment, the electronic device may automatically detect ineffective words and/or speech pauses contained in the video after the detection operation is received, and automatically cut the detected ineffective words and/or speech pauses from the video when the deletion operation is received, so that the user does not need to search by watching the video repeatedly or manually determine and cut the cropping points for the searched ineffective words and/or speech pauses, which can simplify the operations required during the video cropping process, reduce the time consumed in video cropping, and improve the quality of the video, thereby improving the interest of the users in capturing and posting a video and the viewing experience of the viewer.

When the deletion operation is received, the electronic device may determine the time nodes corresponding to the starting point and the ending point of the ineffective audio segment corresponding to the target ineffective audio segment information in the video for each target ineffective audio segment information, make the video segment between the two determined time nodes as the video segment corresponding to the target ineffective audio segment information (i.e., the target sub-video segment), and crop the target sub-video segment from the video, for example, deleting the video frame between the two determined time nodes and the audio data between the two time nodes. In addition, after the video segment corresponding to the target ineffective audio segment information is deleted, it is also possible to add a fade-in and fade-out effect to the video frame located proximate to the video segment in the video, so as to avoid abrupt transition of the video after cropping the video segment and improve the visual effect of the video.

In this embodiment, the video in the video editing page may be the video captured by the user; for example, the user may capture a video in the video capturing page, and, after capturing is completed, shift to the video editing page to edit the captured video, for example, deleting ineffective words and/or speech pauses in the video, cropping other parts of the captured video, and adding special effects, background music, subtitles or stickers and the like to the captured video. In addition, when the video segment corresponding to the target ineffective audio segment information is deleted, the electronic device may return to the video editing page; therefore, the user may continue to edit the video after deleting the video segment corresponding to the target ineffective audio segment information in the video editing page, and may trigger the next control 21 (as shown in FIG. 2) in the video editing page to enter the posting page after editing is completed; correspondingly, when it is detected that the user triggers the next control 21 in the video editing page, the electronic device may shift the current page to the posting page of the video for the user to fill in the posting information of the video, and synthesize all the video segments in the video and post the synthesized video when the user triggers the posting control in the posting page.

The video processing method provided in this embodiment comprises: receiving a detection operation for a video; detecting an ineffective audio segment in the video and displaying the ineffective audio segment information in response to the detection operation; receiving a deletion operation for a video segment corresponding to the target ineffective audio segment information; and deleting the video segment corresponding to the target ineffective audio segment information in the video in response to the deletion operation. In the embodiment of the present disclosure, by using the above technical solution, the video segments with ineffective words and/or statement pauses in the video are automatically detected and deleted, so that the user does not need to repeatedly watch the video to make a search or perform manual deletion, which can simplify the operation required for video cropping, reduce the cropping difficulty of the video and the time consumed by video cropping, and improve the quality of the video.

FIG. 5 is a flowchart of another video processing method provided by an embodiment of the present disclosure. The solution in this embodiment may be combined with one or more solutions in the above-described embodiments.

In one embodiment, after displaying the detection result page, there further comprises: playing the video in the video preview area with the time node corresponding to the starting point of the preset text statement in the video as the play starting point.

In one embodiment, after displaying the detection result page, there further comprises: receiving a play operation for a target text statement; and playing, in response to the play operation, the video in the video preview area with the time node corresponding to the starting point of the target text statement in the video as the play starting point.

In one embodiment, after displaying the detection result page, there further comprises: receiving a play progress adjustment operation for a video; and adjusting, in response to the playing progress adjustment operation, the playing progress of the video in the video preview area.

In one embodiment, the video processing method further comprises: displaying a text statement played in the video preview area at a preset trigger position in the result display area in a set display state.

Correspondingly, as shown in FIG. 5, the video processing method provided by this embodiment comprises:

In S201, a detection operation for a video is received.

In S202, in response to the detection operation, an ineffective audio segment in the video is detected, a detection result page is displayed, a text statement corresponding to the ineffective audio segment is displayed in a result display area of the detection result page, and the video is played in a video preview area of the result detection page with a time node corresponding to a starting point of a preset text statement as a play starting point, and S203, S205 or S207 is performed, wherein the text statement is obtained by performing speech recognition on the audio statement in which the ineffective audio segment is located, the text statement comprises an effective statement segment and the ineffective statement segment, and the ineffective statement segment is displayed differently from the effective statement segment.

In this embodiment, after shifting to the detection result page, a text statement (for example, the text statement corresponding to the first ineffective audio segment) may be automatically played in the detection result page for convenient view by the user.

As shown in FIG. 4, when the detection operation is received, the electronic device may shift the current page from the video editing page to the detection result page, display the text statement 402 corresponding to each detected ineffective audio segment in the result display area 40 of the detection result page according to the temporal sequence of a plurality of statements in the video, and play the video segment corresponding to the first text statement in the video preview area 41 of the detection result page, for example, determining the time node corresponding to the starting point of the first text statement in the video, and playing the video starting from the time node in the video preview area 41.

In S203, a play operation for a target text statement is received.

The play operation may be a trigger operation to instruct the electronic device to play a text statement, that is, an operation to instruct the electronic device to play a video segment corresponding to a text statement in the video preview area, which may be an operation to trigger (for example, clicking) a text statement displayed in the result display area, for example, an operation to trigger an ineffective statement segment or an effective statement segment in a text statement displayed in the result display area; and may also be an operation by moving a text statement displayed in the result display area to a preset trigger position. For example, the receiving a play operation for a target text statement comprises: receiving a first play operation acting on any ineffective statement segment in the target text statement; or receiving a second play operation acting on an effective statement segment in the target text statement; or receiving a third play operation to move the target text statement to a preset trigger position in the result display area. Correspondingly, the target text statement may be the text statement on which the play operation acts, for example, the text statement triggered by the user or the text statement moved to the preset trigger position by the user.

The electronic device displays the text statement in the result display area. Therefore, when intended to view a video segment corresponding to a text statement, the user may perform a play operation for the text statement, for example, triggering an ineffective statement segment or a non-ineffective statement segment in the text statement, or moving the text statement to a preset triggering position in the result display area through a sliding operation. Correspondingly, when it is detected that the user triggers a text statement displayed in the result display area, the electronic device determines that a play operation for a text statement is received; alternatively, the electronic device may control all the text statements displayed in the result display area to move along with the user's sliding direction when the user's sliding operation (for example, the vertical sliding operation) is detected, and determine that the play operation for the text statement located at a preset trigger position is received when a text statement moves to a preset trigger position, or when the sliding operation ends. Wherein, the preset trigger position may be set as necessary, for example, the preset trigger position may be set as an area at the top of the result display area.

In S204, in response to the play operation, the video is played in the video preview area with the time node corresponding to the starting point of the target text statement in the video as the play starting point, and S207 is performed.

When a play operation is received, the electronic device may determine the time node corresponding to the starting point of the text statement corresponding to the play operation in the video, and shift the playing progress of the video in the video preview area to the playing progress corresponding to the time node, and play the video from the time node.

In S205, a play progress adjustment operation for a video is received.

In S206, in response to the play progress adjustment operation, the play progress of the video in the video preview area is adjusted.

The play progress adjustment operation may be an operation of adjusting the play progress of the video, for example, an operation of dragging the play progress bar.

In this embodiment, the user may adjust the play progress of the video in the video preview area by dragging the play progress bar.

As shown in FIG. 4, the electronic device plays a video in the video preview area 41 and displays a video playing progress bar 42; therefore, when intended to adjust the play progress of the video in the video preview area 41, the user may drag the play progress bar 42 forward or backward; correspondingly, when it is detected that the user drags the play progress bar 42, the electronic device may determine that the progress adjustment operation is received, and determine the time node after dragging by the user and adjust the video to the time node for play in response to the progress adjustment operation.

When the play of the video is completed, the video playing may be ceased; and the video may also be replayed from the starting point of the video or the first text statement, and this embodiment is not limited thereto.

In S207, a text statement played in the video preview area is displayed at a preset trigger position in the result display area in a set display state.

The preset display state may be set as necessary, for example, the preset display state may be set in a highlighted state, as shown in FIG. 4 (with the first text statement displayed in the preset display state as an example in FIG. 4).

In this embodiment, when the user triggers a text statement displayed in the result display area, or when the user moves a text statement in the result display area to a preset trigger position, the text statement may be played in the video preview area (i.e., playing the video segment corresponding to the text statement); when a text statement is played in the video preview area, it is possible to adjust the display position and/or the display state of the text statement in the result display area, so as to facilitate the user to view a video segment corresponding to each text statement, and/or to determine a text statement played in the video preview area, so as to provide convenience for the user to determine the target ineffective audio segment required to be deleted.

As an example, when intended to view a video segment corresponding to a text statement, the user may trigger the text statement, for example, triggering an effective statement segment in the text statement; correspondingly, when it is detected that the user triggers an effective statement segment of a text statement displayed in the result display area, the electronic device may adjust the playing progress of the video in the video preview area so as to play the video segment corresponding to the text statement in the video preview area; and adjust the display state of the text statement to a preset display state, and move the text statement to a preset trigger position in the result display area for display.

When intended to set an ineffective statement segment to a selected state/unselected state, the user may trigger the ineffective statement segment; correspondingly, when it is detected that the user triggers an ineffective statement segment displayed in the result display area, the electronic device may adjust the playing progress of the video in the video preview area to play the video segment corresponding to the text statement in which the ineffective statement segment is located in the video preview area, and shift the ineffective statement segment from the selected state/unselected state to the unselected state/selected state, adjust the display state of the text statement in which the ineffective statement segment is located to the preset display state, and move the text statement in which the ineffective statement segment is located to a preset trigger position in the result display area for display.

When intended to shift the text statement displayed in the result display area, or when intended to adjust the display position of the text statement in the result display area, the user may perform a sliding operation, for example, sliding longitudinally (i.e., sliding vertically); correspondingly, when it is detected that the user performs a longitudinal sliding operation in the result display area, the electronic device may control all the text statements to move up or down synchronously with the user's sliding direction, and when a text statement moves to a preset trigger position in the result display area, the text statement is displayed in a preset display state, and the playing progress of the video in the video preview area is adjusted so as to play the video segment corresponding to the text statement in the video preview area. In addition, when it is detected that the user performs a longitudinal sliding operation, the electronic device may also display a position marker of the preset trigger position in the result display area, for example, displaying a boundary, a middle line or a boundary line of the preset trigger position, so that the user can determine the preset trigger position and move the text statement intended to be viewed to the preset trigger position.

The user may adjust the playing progress of the video in the video preview area by performing the progress adjustment operation; when the video segment played in the video preview area after the user adjusts the playing progress is a video segment corresponding to a text statement, that is, when the video segment played in the video preview area after the user adjusts the playing progress is a text statement, or when the video in the video preview area is played to a text statement, the electronic device may automatically adjust the display positions of all the text statements in the result display area so as to adjust the text statement that is being played in the video preview area to a preset trigger position for display, and adjust the display state of the text statement that is being played in the video preview area to a preset display state.

In S208, a deletion operation for the target ineffective statement segment is received.

In S209, the video segment corresponding to the target ineffective statement segment in the video is deleted in response to the deletion operation.

In the video processing method provided by this embodiment, the user may instruct the electronic device to play the video segment corresponding to the text statement in the video preview area by triggering a text statement in the result display area or moving a text statement in the trigger result display area to the preset triggering position; and when the video segment corresponding to a text statement is played, the electronic device automatically adjusts the display position and/or display state of the text statement, which can realize the interlock between the video preview area and the result display area and provide convenience for the user to view the video segment corresponding to the text statement and the text statement corresponding to the video segment played in the video preview area; in this way, the user can rapidly determine the ineffective statement segments need to be deleted, shorten the time spent on video cropping and improve the user's experience.

Figure 6:
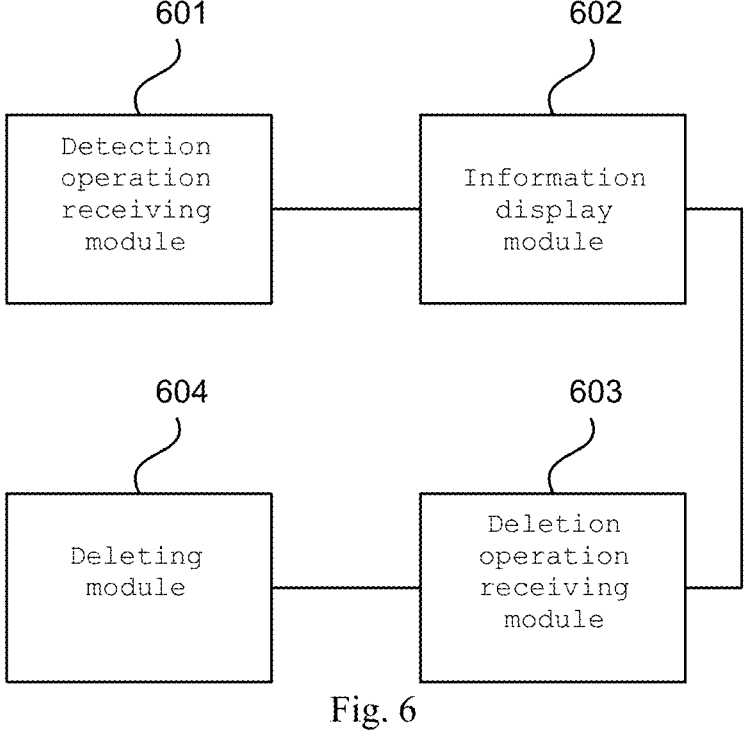
FIG. 6 is a structural block view of a video processing apparatus provided by an embodiment of the present disclosure.

FIG. 6 is a structural block view of a video processing apparatus provided by an embodiment of the present disclosure. The apparatus may be implemented by software and/or hardware, and may be configured in an electronic device, for example, the apparatus may be configured in a mobile phone or a tablet computer, so that the ineffective statement segments and/or speech pause segments in the video may be detected and deleted by performing the video processing method. As shown in FIG. 6, the video processing apparatus provided by this embodiment may comprise: a detection operation receiving module 601, an information display module 602, a deletion operation receiving module 603 and a deleting module 604, wherein the detection operation receiving module 601 is configured to receive a detection operation for a video; an information display module 602 configured to detect an ineffective audio segment in the video and display the ineffective audio segment information in response to the detection operation; a deletion operation receiving module 603 configured to receive a deletion operation for a video segment corresponding to the target ineffective audio segment information; and a deleting module 604 configured to delete the video segment corresponding to the target ineffective audio segment information in the video in response to the deletion operation.

The video processing apparatus provided in this embodiment receives a detection operation for a video by a detection operation receiving module; detects ineffective audio segments in the video and displays the ineffective audio segment information by an information display module; receives a deletion operation for a video segment corresponding to the target ineffective audio segment information by a deletion operation receiving module; and deletes the video segment corresponding to the target ineffective audio segment information in the video by the deleting module in response to the deletion operation. By using the above-described technical solution, this embodiment automatically detects and deletes the video segments with ineffective words and/or statement pauses in the video, so that the user does not need to repeatedly watch the video to make a search or perform manual deletion, which can simplify the operation required for video cropping, reduce the cropping difficulty of the video and the time consumed by video cropping, and improve the quality of the video.

In the above-described solution, the ineffective audio segment information may comprise an ineffective statement segment corresponding to the ineffective audio segment, and the information display module 602 may be configured to display a text statement corresponding to the ineffective audio segment, wherein the text statement is obtained by performing speech recognition on the audio statement in which the ineffective audio segment is located, and the text statement comprises an effective statement segment and the ineffective statement segment, and the ineffective statement segment is displayed differently from the effective statement segment.

In the above-described solution, the information display module 602 may be configured to display a detection result page and display a text statement corresponding to the ineffective audio segment in the result display area of the detection result page, wherein the detection result page also contains a video preview area for playing the video.

In the above-described solution, the information display module 602 may also be configured to play the video in the video preview area with the time node corresponding to the starting point of the preset text statement as the play starting point after the detection result page is displayed.

The video processing apparatus provided by this embodiment may further comprise: a play operation receiving module configured to receive a play operation for a target text statement after the displaying a detection result page; a video playing module configured to play the video in the video preview area with the time node corresponding to the starting point of the target text statement in the video as the play starting point in response to the play operation.

In the above-described solution, the play operation receiving module may be configured to: receive a first play operation acting on any ineffective statement segment in the target text statement; or receive a second play operation acting on an effective statement segment in the target text statement; or receive a third play operation to move the target text statement to a preset trigger position in the result display area.

The video processing apparatus provided by this embodiment may further comprise: a progress adjustment operation receiving module configured to receive a play progress adjustment operation for the video after the displaying a detection result page; and a progress adjusting module configured to adjust a playing progress of the video in the video preview area in response to the playing progress adjustment operation.

In the above-described solution, the information display module 602 may be configured to: display a text statement played in the video preview area at a preset trigger position in the result display area in a set display state.

In the above-described solution, the target ineffective audio segment information may be the ineffective audio segment information in a selected state, and the video processing apparatus provided by this embodiment may further comprise: a state adjustment operation receiving module configured to receive a state adjustment operation for any ineffective audio segment information; a state adjusting module configured to adjust, in response to the state adjustment operation, the display state of the ineffective audio segment information on which the state adjustment operation acts, so as to shift the ineffective audio segment information on which the state adjustment operation acts from the selected state to the unselected state, or shift the ineffective audio segment information on which the state adjustment operation acts from the unselected state to the selected state.

The video processing apparatus provided by this embodiment may further comprise: a trigger operation receiving module configured to receive a trigger operation acting on a video segment cropping control corresponding to a video before the receiving a detection operation for a video, wherein the video comprises at least one video segment; a window display module configured to display, in response to the trigger operation, a setting window for a user to set a video segment to be detected and/or a type of an ineffective audio segment to be detected and perform the detection operation.

The video processing apparatus provided in the embodiment of the present disclosure which may perform the video processing method provided in any embodiment of the present disclosure, has corresponding functional modules and effects for performing the video processing method. For technical details not described in detail in this embodiment, reference may be made to the video processing method provided in any embodiment of the present disclosure.

Figure 7:
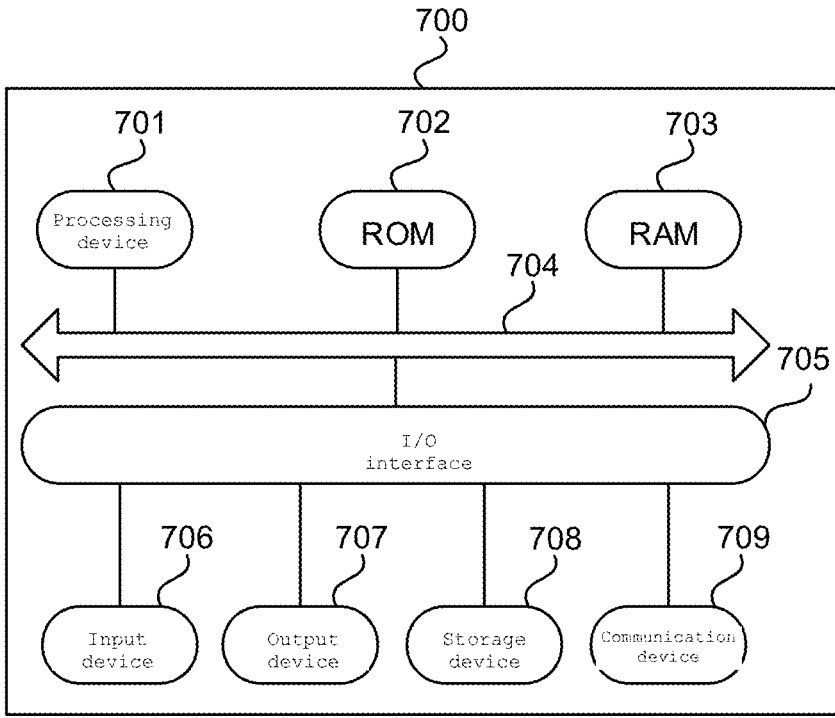
FIG. 7 is a schematic structural view of an electronic device provided by an embodiment of the present disclosure.

Next, referring to FIG. 7, it shows a structural schematic view of an electronic device 700 (for example, a terminal device) suitable for implementing the embodiment of the present disclosure. The terminal device 700 in the embodiment of the present disclosure may comprise, but is not limited to, a mobile terminal such as a mobile phone, a notebook computer, a digital broadcast receiver, a PDA (Personal Digital Assistant), a pad computer (PAD), a PMP (Portable Multimedia Player), an in-vehicle terminal (for example, an in-vehicle navigation terminal), and the like; and a fixed terminal such as a digital television (TV), a desktop computer, and the like. The electronic device 700 shown in FIG. 7 is only an example and shall not limit the functions and application range of the embodiments of the present disclosure.

As shown in FIG. 7, the electronic device 700 may comprise a processing device 701 (for example, a central processing unit, a graphic processor and the like), which may perform a plurality of appropriate actions and processing according to a program stored in a Read-only Memory (ROM) 702 or a program loaded from a storage device 708 into a Random Access Memory (RAM) 703. In the RAM 703, a plurality of programs and data required for the operation of the electronic device 700 are also stored. The processing device 701, the ROM 702 and the RAM 703 are connected to each other through a bus 704. The input/output (I/O) interface 705 is also connected to the bus 704.

Generally, the following devices may be connected to the I/O interface 705: an input device 706 comprising, for example, a touch screen, a touch pad, a keyboard, a mouse, a camera, a microphone, an accelerometer, a gyroscope, and the like; an output device 707 comprising, for example, a Liquid Crystal Display (LCD), a speaker, a vibrator and the like; a storage device 706 comprising, for example, a magnetic tape, a hard disk, and the like; and a communication device 709. The communication device 709 may allow the electronic device 700 to be in wireless or wired communication with other devices to exchange data. Although FIG. 7 shows the electronic device 700 with a plurality of devices, there is no need to implement or have all the devices shown. It is possible to alternatively implement or have more or less devices.

According to an embodiment of the present disclosure, the process described above with reference to the flowchart may be implemented as a computer software program. For example, in an embodiment of the present disclosure, there comprises a computer program product, which comprises a computer program carried on a non-transient computer-readable medium, wherein the computer program contains program codes for executing the method shown in the flowchart. In such embodiment, the computer program may be downloaded and installed from the network through the communication device 709, installed from the storage device 708, or installed from the ROM 702. When the computer program is executed by the processing device 701, the above-described functions defined in the method of the embodiment of the present disclosure are executed.

The above-described computer-readable medium of the present disclosure may be a computer-readable signal medium, a computer-readable storage medium or any combination thereof. The computer-readable storage medium may be, for example, but is not limited to: an electrical, magnetic, optical, electromagnetic, infrared, or semiconductor system, apparatus, or device, or a combination thereof. Examples of the computer-readable storage medium may comprise, but is not limited to: an electrical connection having one or more wires, a portable computer disk, a hard disk, a RAM, a ROM, an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium that contains or stores a program which may be used by an instruction execution system, apparatus, or device or used in combination therewith. In the present disclosure, the computer-readable signal medium may comprise a data signal propagated in a baseband or as a part of a carrier wave, wherein a computer-readable program code is carried. Such propagated data signal may take many forms, comprising but not limited to an electromagnetic signal, an optical signal, or any suitable combination thereof. The computer-readable signal medium may also be any computer-readable medium other than the computer-readable storage medium, and the computer-readable signal medium may send, propagate, or transmit a program for use by an instruction execution system, apparatus, or device or in combination with therewith. The program code contained on the computer-readable medium may be transmitted by any suitable medium, comprising but not limited to: a wire, an optical cable, radio frequency (RF), and the like, or any suitable combination thereof.

In some embodiments, the client and the server may communicate using any currently known or future developed network protocol such as Hyper Text Transfer Protocol (HTTP) and may be interconnected with digital data communication in any form or medium (for example, communication network). Examples of communication networks comprise a Local Area Network (LAN), a Wide Area Network (WAN), an extranet (for example, Internet) and an end-to-end network (for example, an ad hoc end-to-end network), as well as any currently known or future developed network.

The above-described computer-readable medium may be comprised in the above-described electronic device; or may also exist alone without being assembled into the electronic device.

The above-described computer-readable medium carries one or more programs that, when executed by the electronic device, cause the electronic device to: receive a detection operation for a video; detect an ineffective audio segment in the video and display the ineffective audio segment information in response to the detection operation; receive a deletion operation for a video segment corresponding to the target ineffective audio segment information; and delete the video segment corresponding to the target ineffective audio segment information in the video in response to the deletion operation.

The computer program code for performing the operations of the present disclosure may be written in one or more programming languages or a combination thereof, and the above-described programming languages comprise but are not limited to object-oriented programming languages, such as Java, Smalltalk, and C++, and also comprise conventional procedural programming languages, such as "C" language or similar programming languages. The program code may be executed entirely on the user's computer, partly on the user's computer, executed as an independent software package, partly on the user's computer and partly executed on a remote computer, or entirely executed on the remote computer or server. In the case of a remote computer, the remote computer may be connected for the user's computer through any kind of network (comprising a LAN or a WAN), or may be connected to an external computer (for example, connected through Internet using an Internet service provider).

The flowcharts and block views in the accompanying drawings illustrate the possibly implemented architectures, functions, and operations of the system, method, and computer program product according to a plurality of embodiments of the present disclosure. In this make, each block in the flowchart or block view may represent a module, a program segment, or a part of code, wherein the module, the program segment, or the part of code contains one or more executable instructions for realizing a specified logic function. It should also be noted that, in some alternative implementations, the functions marked in the block may also occur in a different order from the order marked in the accompanying drawings. For example, two blocks shown in succession which may actually be executed substantially in parallel, may sometimes also be executed in a reverse order, depending on the functions involved. It should also be noted that each block in the block view and/or flowchart, and a combination of the blocks in the block view and/or flowchart, may be implemented by a dedicated hardware-based system that performs the specified functions or operations, or may be implemented by a combination of dedicated hardware and computer instructions.

The units involved in the described embodiments of the present disclosure may be implemented in software or hardware. Wherein, the names of the modules do not constitute a limitation on the units themselves under a certain circumstance.

The functions described hereinabove may be performed at least in part by one or more hardware logic components. For example, non-restrictively, the hardware logic components of a demonstrative type that may be used comprise: a Field Programmable Gate Array (FPGA), an Application Specific Integrated Circuit (ASIC), an Application Specific Standard Part (ASSP), a System on Chip (SOC), a Complex Programmable Logical device (CPLD) and the like.

The context of the present disclosure, a machine-readable medium may be a tangible medium, which may contain or store a program for use by the instruction execution system, apparatus, or device or use in combination with the instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus or device, or any suitable combination thereof. Examples of the machine-readable storage medium may comprise an electrical connection based on one or more wires, a portable computer disk, a hard disk, a RAM, a ROM, an EPROM or flash memory, an optical fiber, a CD-ROM, an optical storage device, a magnetic storage device, or any suitable combination thereof.

According to one or more embodiments of the present disclosure, Example 1 provides a video processing method, comprising:

receiving a detection operation for a video;

detecting an ineffective audio segment in the video and displaying the ineffective audio segment information in response to the detection operation;

receiving a deletion operation for a video segment corresponding to the target ineffective audio segment information; and deleting the video segment corresponding to the target ineffective audio segment information in the video in response to the deletion operation.

According to one or more embodiments of the present disclosure, Example 2 provides the method according to Example 1, wherein the ineffective audio segment information comprises an ineffective statement segment corresponding to the ineffective audio segment, and the displaying the ineffective audio segment information comprises:

displaying a text statement corresponding to the ineffective audio segment, wherein the text statement is obtained by performing speech recognition on the audio statement in which the ineffective audio segment is located, the text statement comprises an effective statement segment and the ineffective statement segment, and the ineffective statement segment is displayed differently from the effective statement segment.

According to one or more embodiments of the present disclosure, Example 3 provides the method according to Example 2, and the displaying a text statement corresponding to the ineffective audio segment comprises:

displaying a detection result page, and displaying a text statement corresponding to the ineffective audio segment in a result display area of the detection result page, wherein the detection result page also contains a video preview area for playing the video.

According to one or more embodiments of the present disclosure, Example 4 provides the method according to Example 3, which further comprises, after the displaying the detection result page:

playing the video in the video preview area with the time node corresponding to the starting point of the preset text statement in the video as the play starting point.

According to one or more embodiments of the present disclosure, Example 5 provides the method according to Example 3, which further comprises, after the displaying the detection result page:

receiving a play operation for a target text statement; and playing, in response to the play operation, the video in the video preview area with the time node corresponding to the starting point of the target text statement in the video as the play starting point.

According to one or more embodiments of the present disclosure, Example 6 provides the method according to Example 5, wherein the receiving a play operation for a target text statement comprises:

receiving a first play operation acting on any ineffective statement segment in the target text statement; or receiving a second play operation acting on an effective statement segment in the target text statement; or receiving a third play operation to move the target text statement to a preset trigger position in the result display area.

According to one or more embodiments of the present disclosure, Example 7 provides the method according to Example 3, which further comprises:

after the displaying the detection result page, further comprising:

receiving a play progress adjustment operation for the video; and adjusting the playing progress of the video in the video preview area in response to the playing progress adjustment operation.

According to one or more embodiments of the present disclosure, Example 8 provides the method according to any of Examples 3 to 7, which further comprises, before the receiving the detection operation for the target video segment in the video:

displaying a text statement played in the video preview area at a preset trig position in the result display area in a set display state.

According to one or more embodiments of the present disclosure, Example 9 provides the method according to any of Examples 1 to 7, wherein the target ineffective audio segment information is the ineffective audio segment information in a selected state, and the method further comprises:

receiving a state adjustment operation for any ineffective audio segment information; and adjusting, in response to the state adjustment operation, the display state of the ineffective audio segment information on which the state adjustment operation acts to shift the ineffective audio segment information on which the state adjustment operation acts from the selected state to the unselected state, or shift the ineffective audio segment information on which the state adjustment operation acts from the unselected state to the selected state.

According to one or more embodiments of the present disclosure, Example 10 provides the method according to any of Examples 1 to 7, which further comprises, before the receiving the detection operation for video:

receiving a trigger operation acting on a video segment cropping control corresponding to the video, wherein the video contains at least one video segment; and displaying, in response to that trigger operation, a setting window for a user to set a video segment to be detected and/or a type of an ineffective audio segment to be detected and perform the detection operation.

According to one or more embodiments of the present disclosure, Example 11 provides a video processing apparatus, comprising:

a detection operation receiving module configured to receive a detection operation for a video;

an information display module configured to detect an ineffective audio segment in the video and display the ineffective audio segment information in response to the detection operation;

a deletion operation receiving module configured to receive a deletion operation for a video segment corresponding to the target ineffective audio segment information; and a deleting module configured to delete the video segment corresponding to the target ineffective audio segment information in the video in response to the deletion operation.

According to one or more embodiments of the present disclosure, Example 12 provides an electronic device comprising:

one or more processors; and a memory arranged to store one or more programs;

when executed by the one or more processors, the one or more programs cause the one or more processors to implement the video processing method according to any of Examples 1 to 10.

According to one or more embodiments of the present disclosure, Example 13 provides a computer-readable storage medium having a computer program stored thereon that, when executed by a processor, implements the video processing method according to any of Examples 1 to 10.

In addition, although a plurality of operations are depicted in a specific order, this should not be understood as requiring these operations to be performed in the specific order shown or performed in a sequential order. Under certain circumstances, multitasking and parallel processing might be advantageous. Likewise, although a plurality of implementation details are contained in the above discussion, these should not be construed as limiting the scope of the present disclosure. Some features that are described in the context of individual embodiments may also be implemented in combination in a single embodiment. On the contrary, a plurality of features described in the context of a single embodiment may also be implemented in multiple embodiments individually or in any suitable sub-combination.

What is claimed is:

1. A method of processing videos, comprising:

receiving a detection operation for a video;

detecting an ineffective audio segment in the video and displaying an ineffective audio segment information in response to the detection operation, wherein the displaying the ineffective audio segment information comprises:

displaying a detection result page, and displaying the ineffective audio segment information in a result display area of the detection result page, wherein the detection result page contains a video preview area for playing the video;

receiving a deletion operation for a video segment corresponding to a target ineffective audio segment information; and deleting the video segment corresponding to the target ineffective audio segment information in the video in response to the deletion operation.

2. The method according to claim 1, wherein the ineffective audio segment information comprises an ineffective statement segment corresponding to the ineffective audio segment; and the displaying the ineffective audio segment information comprises:

displaying a text statement corresponding to the ineffective audio segment, wherein the text statement is obtained by performing the speech recognition on an audio statement in which the ineffective audio segment is located, and the text statement comprises an effective statement segment and the ineffective statement segment, and the ineffective statement segment is displayed differently from the effective statement segment.

3. The method according to claim 1, after displaying the detection result page, further comprising:

playing the video in the video preview area with a time node corresponding to a starting point of a preset text statement in the video as a play starting point.

4. The method according to claim 1, after displaying the detection result page, further comprising:

receiving a play operation for a target text statement; and playing, in response to the play operation, the video in the video preview area with a time node corresponding to a starting point of the target text statement in the video as a play starting point.

5. The method according to claim 4, wherein the receiving the play operation for the target text statement comprises:

receiving a first play operation acting on an ineffective statement segment in the target text statement; or receiving a second play operation acting on an effective statement segment in the target text statement; or receiving a third play operation to move the target text statement to a preset trigger position in the result display area.

6. The method according to claim 1, after displaying the detection result page, further comprising:

receiving a play progress adjustment operation for the video; and adjusting a playing progress of the video in the video preview area in response to the playing progress adjustment operation.

7. The method according to claim 1, further comprising:

displaying a text statement played in the video preview area at a preset trig position in the result display area in a set display state.

8. The method according to claim 1, wherein the target ineffective audio segment information is the ineffective audio segment information in a selected state; and the method further comprises:

receiving a state adjustment operation for an ineffective audio segment information; and adjusting, in response to the state adjustment operation, the display state of the ineffective audio segment information on which the state adjustment operation acts to shift the ineffective audio segment information on which the state adjustment operation acts from the selected state to an unselected state, or shift the ineffective audio segment information on which the state adjustment operation acts from the unselected state to the selected state.

9. The method according to claim 1, before the receiving a detection operation for a video, further comprising:

receiving a trigger operation acting on a video segment cropping control corresponding to the video, wherein the video contains at least one video segment; and displaying, in response to the trigger operation, a setting window for a user to set at least one of a video segment to be detected or a type of an ineffective audio segment to be detected and perform the detection operation.

10. An electronic device, comprising:

at least one processor;

a memory configured to store at least one program;

when executed by the at least one processor, the at least one program cause the at least one processor to implement operations, the operations comprising:

receiving a detection operation for a video;

detecting an ineffective audio segment in the video and displaying an ineffective audio segment information in response to the detection operation, wherein the displaying the ineffective audio segment information comprises:

displaying a detection result page, and displaying the ineffective audio segment information in a result display area of the detection result page, wherein the detection result page contains a video preview area for playing the video;

receiving a deletion operation for a video segment corresponding to a target ineffective audio segment information; and deleting the video segment corresponding to the target ineffective audio segment information in the video in response to the deletion operation.

11. The electronic device according to claim 10, wherein the ineffective audio segment information comprises an ineffective statement segment corresponding to the ineffective audio segment; and the displaying the ineffective audio segment information comprises:

displaying a text statement corresponding to the ineffective audio segment, wherein the text statement is obtained by performing the speech recognition on an audio statement in which the ineffective audio segment is located, and the text statement comprises the effective statement segment and the ineffective statement segment, and the ineffective statement segment is displayed differently from the effective statement segment.

12. The electronic device according to claim 10, wherein after displaying the detection result page, the method operations further comprising:

playing the video in the video preview area with a time node corresponding to a starting point of a preset text statement in the video as a play starting point.

13. The electronic device according to claim 12, wherein after displaying the detection result page, the method operations further comprising:

receiving a play operation for a target text statement; and playing, in response to the play operation, the video in the video preview area with a time node corresponding to a starting point of the target text statement in the video as a play starting point.

14. A non-transitory computer-readable storage medium having a computer program stored thereon that, when executed by a processor, implements operations, the operations comprising:

receiving a detection operation for a video;

detecting an ineffective audio segment in the video and displaying an ineffective audio segment information in response to the detection operation, wherein the displaying the ineffective audio segment information comprises:

displaying a detection result page, and displaying the ineffective audio segment information in a result display area of the detection result page, wherein the detection result page contains a video preview area for playing the video;

receiving a deletion operation for a video segment corresponding to a target ineffective audio segment information; and deleting the video segment corresponding to the target ineffective audio segment information in the video in response to the deletion operation.

15. The non-transitory computer-readable storage medium according to claim 14, wherein the ineffective audio segment information comprises an ineffective statement segment corresponding to the ineffective audio segment; and the displaying the ineffective audio segment information comprises:

displaying a text statement corresponding to the ineffective audio segment, wherein the text statement is obtained by performing speech recognition on an audio statement in which the ineffective audio segment is located, and the text statement comprises an effective statement segment and the ineffective statement segment, and the ineffective statement segment is displayed differently from the effective statement segment.

16. The non-transitory computer-readable storage medium according to claim 14, wherein after displaying the detection result page, the operations further comprising:

playing the video in the video preview area with a time node corresponding to a starting point of a preset text statement in the video as a play starting point.

17. The non-transitory computer-readable storage medium according to claim 16, wherein after displaying the detection result page, the operations further comprising:

receiving a play operation for a target text statement; and playing, in response to the play operation, the video in the video preview area with a time node corresponding to a starting point of the target text statement in the video as a play starting point.

\*    \*    \*    \*    \*